United States Patent
Kim et al.

(10) Patent No.: US 9,624,845 B2
(45) Date of Patent: Apr. 18, 2017

(54) DUAL FUEL INJECTOR AND ENGINE USING SAME

(71) Applicant: Caterpillar Inc., Peoria, IL (US)

(72) Inventors: Hoisan Kim, Dunlap, IL (US); Mark F. Sommars, Hopewell, IL (US); Xiangdong Ding, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 48 days.

(21) Appl. No.: 14/604,091

(22) Filed: Jan. 23, 2015

(65) Prior Publication Data

US 2015/0136073 A1     May 21, 2015

Related U.S. Application Data

(62) Division of application No. 13/105,138, filed on May 11, 2011, now Pat. No. 8,967,502.

(51) Int. Cl.
| | |
|---|---|
| *F02D 41/30* | (2006.01) |
| *F02D 19/06* | (2006.01) |
| *F02D 19/10* | (2006.01) |
| *F02M 43/04* | (2006.01) |
| *F02M 45/08* | (2006.01) |
| *F02M 47/02* | (2006.01) |
| *F02M 63/02* | (2006.01) |
| *F02M 51/06* | (2006.01) |

(52) U.S. Cl.
CPC ..... *F02D 19/0615* (2013.01); *F02D 19/0684* (2013.01); *F02D 19/0694* (2013.01); *F02D 19/10* (2013.01); *F02M 43/04* (2013.01); *F02M 45/086* (2013.01); *F02M 47/027* (2013.01); *F02M 51/06* (2013.01); *F02M 51/0625* (2013.01); *F02M 63/029* (2013.01); *F02M 2200/44* (2013.01); *F02M 2200/46* (2013.01); *Y02T 10/36* (2013.01)

(58) Field of Classification Search
CPC .......... F02M 51/0685; F02M 51/0642; F02M 51/0646; F02M 51/065; F02M 63/029; F02M 45/086; F02M 47/027; F02M 43/04; F02M 2200/46; F02M 2200/44; F02D 19/0615; F02D 19/10; Y02T 10/36
USPC .................. 123/299, 304, 490, 525, 27 GE; 239/585.1–585.3, 533.2, 533.9, 418; 137/594, 601.14; 251/129.1

See application file for complete search history.

(56) References Cited

U.S. PATENT DOCUMENTS

| | | |
|---|---|---|
| 4,499,862 A | 2/1985 | Baumer et al. |
| 4,700,672 A | 10/1987 | Baguena |

(Continued)

FOREIGN PATENT DOCUMENTS

| | | |
|---|---|---|
| EP | 0778410 A1 | 6/1997 |
| WO | 0246599 A1 | 6/2002 |
| WO | 2011162681 A1 | 12/2011 |

*Primary Examiner* — Hai Huynh

(57) ABSTRACT

A dual fuel injector may be used to inject both gas and liquid fuel into a cylinder of a compression ignition engine. An injector body defines a first set of nozzle outlets, a second set of nozzle outlets, a first fuel inlet and a second fuel inlet. A dual solenoid actuator includes a first armature, a first coil, a second armature and a second coil that share a common centerline. The dual solenoid actuator has a non-injection configuration at which the first armature is at an un-energized position and the second armature is at an un-energized position. The dual solenoid actuator has a first fuel injection configuration at which the first fuel inlet is fluidly connected to the first set of nozzle outlets, the first armature is at an energized position and the second armature is at the un-energized position.

20 Claims, 5 Drawing Sheets

(56) References Cited

U.S. PATENT DOCUMENTS

| | | | |
|---|---|---|---|
| 6,073,862 | A | 6/2000 | Touchette et al. |
| 6,113,014 | A | 9/2000 | Coldren et al. |
| 6,267,306 | B1 | 7/2001 | Phillips et al. |
| 6,328,230 | B1 | 12/2001 | Prillwitz et al. |
| 6,422,199 | B1 | 7/2002 | Buckley et al. |
| 6,601,566 | B2 | 8/2003 | Gillis et al. |
| 6,739,522 | B2 | 5/2004 | Laumen |
| 6,769,635 | B2 | 8/2004 | Stewart et al. |
| 6,945,475 | B2 | 9/2005 | Lawrence et al. |
| 7,124,959 | B2 | 10/2006 | Baker et al. |
| 7,373,931 | B2 | 5/2008 | Lennox et al. |
| 7,556,017 | B2 | 7/2009 | Gibson |
| 7,779,854 | B2 | 8/2010 | Lewis et al. |
| 7,891,579 | B2 * | 2/2011 | Mashida ................. F02D 19/10 239/533.11 |
| 9,212,639 | B2 * | 12/2015 | Kim ....................... F02M 43/04 |
| 9,453,483 | B2 * | 9/2016 | Kim ..................... F02M 63/008 |
| 2002/0070295 | A1 | 6/2002 | Baker et al. |
| 2008/0169366 | A1 | 7/2008 | Lewis et al. |
| 2009/0020631 | A1 | 1/2009 | Mashida et al. |
| 2014/0123936 | A1 * | 5/2014 | Kim ....................... F02M 43/04 123/299 |
| 2015/0136072 | A1 * | 5/2015 | Kim .................... F02D 19/0684 123/299 |
| 2016/0258401 | A1 * | 9/2016 | Kim ................... F02M 63/0021 |

* cited by examiner

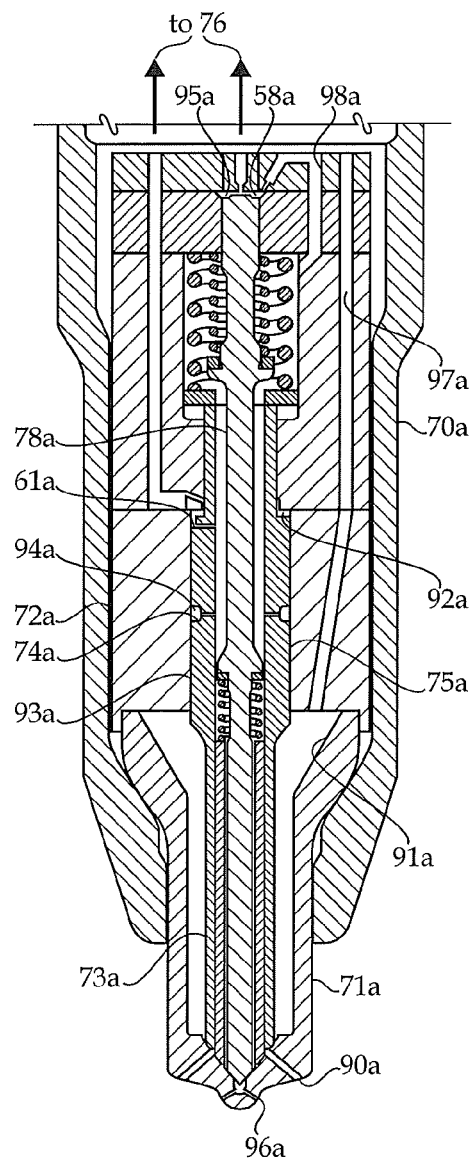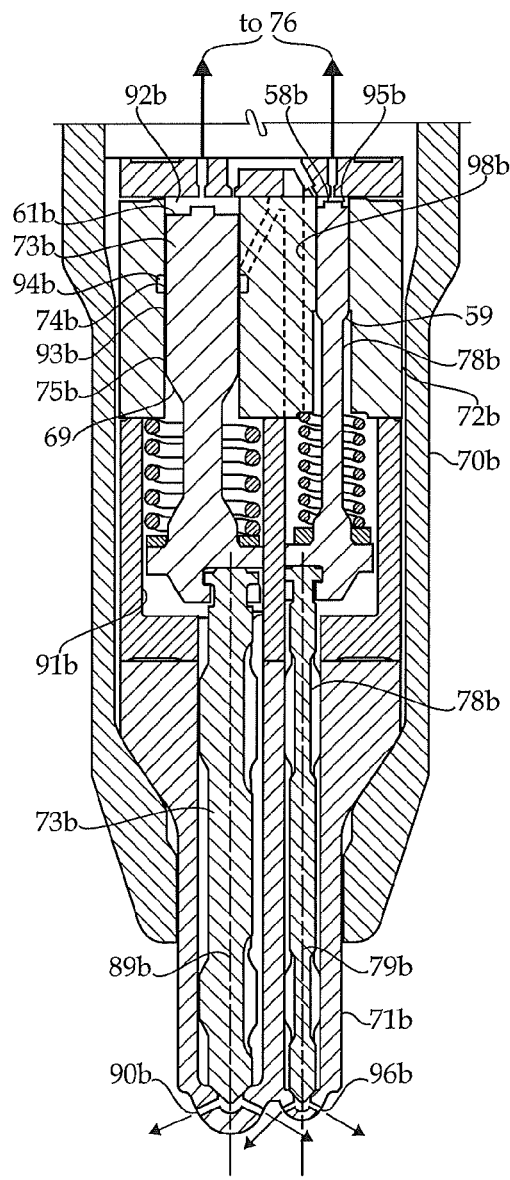
Figure 4                    Figure 5

US 9,624,845 B2

DUAL FUEL INJECTOR AND ENGINE USING SAME

CROSS-REFERENCE TO RELATED APPLICATION

This patent application is a Divisional of U.S. patent application Ser. No. 13/105,138 filed May 11, 2011, entitled "DUAL FUEL INJECTOR AND ENGINE USING SAME," which is incorporated by reference herein in its entirety.

TECHNICAL FIELD

The present disclosure relates generally to dual fuel engines, and more particularly to a dual fuel injector with a coaxial dual solenoid actuator for fueling an engine with gaseous and liquid fuels.

BACKGROUND

Gaseous fuel engines are known for their ability to burn clean relative to their compression ignition engine counterparts. However, gaseous fuels are well known for the difficulty in attaining successful ignition. Some gaseous fuel engines utilize a spark plug, whereas other engines are known for utilizing a small amount of distillate diesel fuel that is compression ignited to in turn ignite a larger charge of gaseous fuel. Practical spatial limitations in and around an engine often make it difficult to find space for all of the plumbing and hardware associated with supplying two different fuels to each combustion chamber. U.S. Pat. No. 7,373,931 teaches a dual fuel engine that utilizes a small quantity and compression ignited distillate diesel fuel to ignite a larger charge of gaseous fuel. This reference teaches the use of a fuel injector with nested needle valve members to facilitate injection of both the gaseous and liquid fuels from the same injector into each engine cylinder. However, the structure of the injector can lead to cross leakage between fuels, leakage of fuel into the engine cylinder and stacked tolerances that may lead to substantial performance variations when the fuel injectors are mass produced. In addition, the injector structure inherently requires different injection patterns depending upon whether the fuels are being injected individually or at the same time.

Apart from the potential problems noted above, there may also be issues with regard to packaging a dual fuel injector with two electrical actuators and control valves in the limited space available in a cylinder head mounting of an engine. The '931 patent shows side-by-side electronically controlled valves for separately controlling gaseous fuel and liquid fuel injection events. In some instances, there may not be enough available space to provide for a side-by-side mounting as shown in this reference.

The present disclosure is directed toward one or more of the problems set forth above.

SUMMARY OF THE DISCLOSURE

In one aspect, a fuel injector includes an injector body that defines a first set of nozzle outlets, a second set of nozzle outlets, a first fuel inlet and a second fuel inlet. A dual solenoid actuator includes a first armature, a first coil, a second armature and a second coil that share a common centerline. The dual solenoid actuator has a non-injection configuration at which the first armature is at an un-energized position and the second armature is at an un-energized position. The dual solenoid actuator has a first fuel injection configuration at which the first fuel inlet is fluidly connected to the first set of nozzle outlets, the first armature is at an energized position and the second armature is at the un-energized position. The dual solenoid actuator has a second fuel injection configuration at which the second fuel inlet is fluidly connected to the second set of nozzle outlets, the first armature is at the un-energized position and the second armature is at an energized position.

In another aspect, an engine includes an engine housing that defines a plurality of cylinders. A dual fuel system includes a plurality of fuel injectors, each including an injector body defining a first set of nozzle outlets and a second set of nozzle outlets positioned for direct injection into one of the plurality of cylinders. The duel fuel system includes a first fuel common rail fluidly connected to a first fuel inlet of each of the plurality of fuel injectors, and a second fuel common rail fluidly connected to a second fuel inlet of each of the plurality of fuel injectors. Each of the plurality of fuel injectors includes a dual solenoid actuator that includes a first armature, a first coil, a second armature and a second coil that share a common centerline.

A method of operating an engine includes a step of injecting a first fuel into an engine cylinder through a first set of nozzle outlets of one of a plurality of fuel injectors. A second fuel is injected into the engine cylinder through a second set of nozzle outlets of the one of the plurality of fuel injectors. Each of the injecting steps includes moving one of a first armature and a second armature toward an other of the first armature and the second armature along a common centerline. The first fuel is ignited by compression igniting the second fuel.

BRIEF DESCRIPTION OF THE DRAWINGS

FIG. 4 is a sectioned side view of a bottom portion of a fuel injector according to one aspect of the present disclosure;

FIG. 5 is a sectioned side bottom portion view of a fuel injector according to another aspect of the present disclosure.

DETAILED DESCRIPTION

Figure 1:
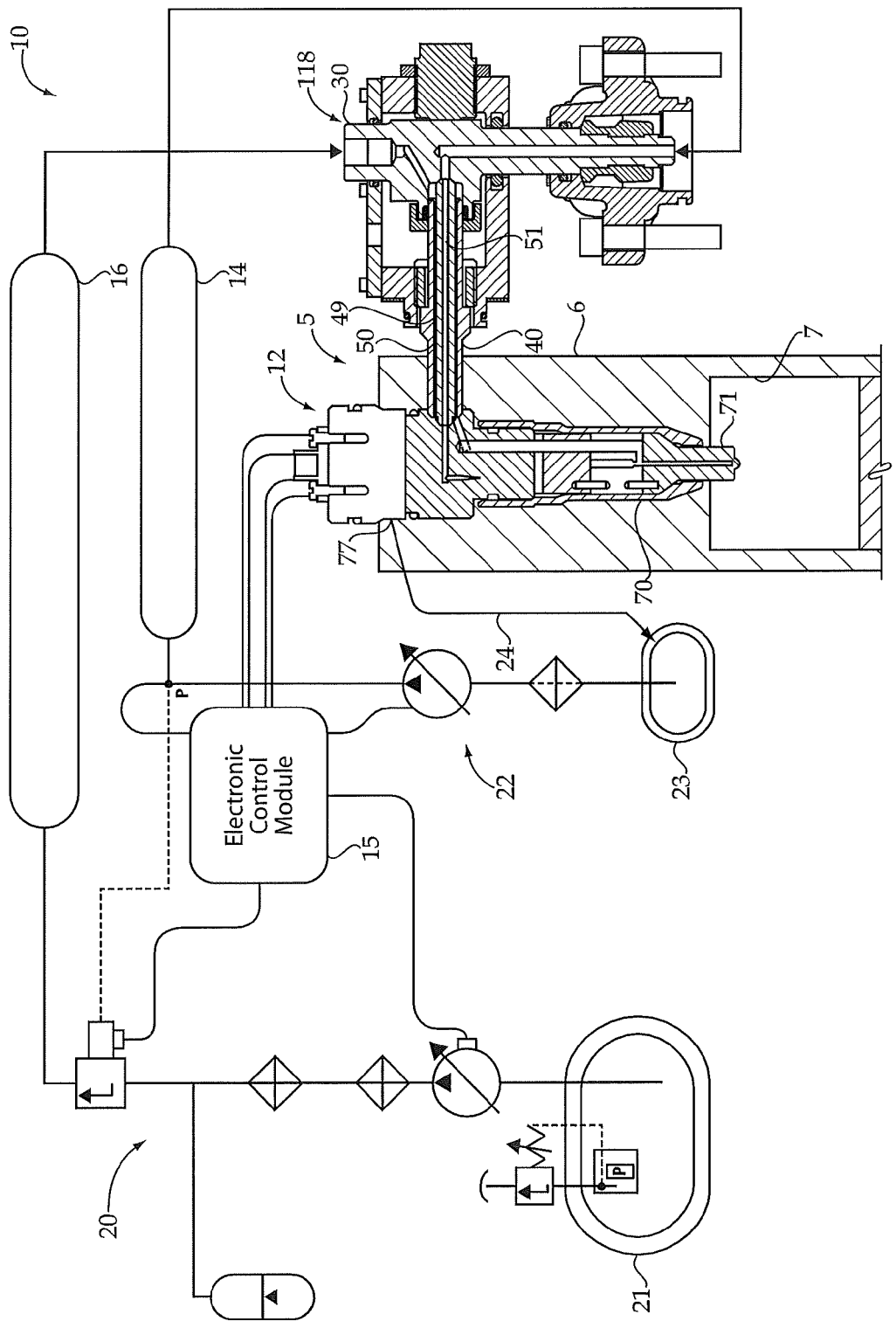
FIG. 1 is a schematic view of an engine and dual fuel common rail system according to the present disclosure.

Referring to FIG. 1, an engine 5 according to the present disclosure utilizes a dual fuel common rail system 10. Engine 5 includes an engine housing 6 that defines a plurality of cylinders 7, only one of which is shown. The dual fuel system 10 includes a plurality of dual fuel injectors 12 (only one shown) that each include an injector body 70 with a tip component 71 positioned for direct injection of gaseous fuel and/or liquid fuel into one of the engine cylinders 7. The dual fuel system 10 includes a plurality of outer tubes 50 and inner tubes 40 that each extend into engine housing 6 between a quill 30 and one of the fuel injectors 12. Each of the inner tubes 50 is compressed between a conical seat on an associated quill 30 and a conical seat on one of the fuel injectors 12. Thus, each engine cylinder 7 has one associated fuel injector 12, one outer tube 40, one inner tube 50 and one quill 30. The dual fuel system 10 includes a gaseous fuel common rail 16 that is fluidly connected to each of the fuel injectors 12 through one of the quills 30 and an outer passage 49 defined between an inner tube 50 and an outer tube 40. A liquid fuel common rail 14 is fluidly connected to each of the fuel injectors 12 through one of the quills 30 and an inner passage 51 defined by the inner tube 50.

An electronic controller 15 is in control communication with each of the fuel injectors 12 to selectively control the timing and quantity of both gaseous and liquid fuel injection events. Electronic controller 15 is also in control communication with a gas pressure control device 20 that is operably coupled to control the pressure in gaseous fuel common rail 16, and also in control communication with a liquid pressure control device 22 operably coupled to control the pressure in liquid fuel common rail 14. Although individual gases, such as methane, propane and the like are within the scope of the present disclosure, natural gas containing a mixture of gas species is particularly applicable to the present disclosure. In addition, the liquid fuel is chosen for the ability for compression ignition at the compression ratio of engine 5. For instance, the liquid fuel may be distillate diesel fuel or some other liquid fuel that is suitable for compression ignition to in turn ignite a charge of gaseous fuel in one of the engine cylinders 7.

In the illustrated embodiment, natural gas is maintained in a liquid state in a cryogenic liquefied natural gas tank 21. A variable displacement cryogenic pump is controlled by electronic controller 15 to pump liquefied natural gas through filters and a heat exchanger for expansion into a gas that is maintained in an accumulator. The gas pressure control device 20 according to the present disclosure may include an electronically controlled valve that supplies a controlled quantity of gaseous fuel from the supply side (accumulator) to the gaseous fuel common rail 16. This described supply strategy for natural gas is particularly suitable when engine 5 is mounted on a moving machine, such as a mining truck or the like. On the otherhand, if engine 5 were stationary, a gas pressure control device may be connected to a source of available natural gas and then compressed and fed to gaseous fuel common rail 16 in a manner that is controlled by electronic controller 15 to maintain a desired pressure in the rail 16.

The liquid fuel supply to liquid fuel common rail 14 begins at a tank 23. In the illustrated embodiment, the liquid fuel pressure control device 22 includes a high pressure common rail fuel pump of a type well known in the art whose output can be controlled by electronic controller 15 to maintain some desired pressure in liquid common rail 14. Another alternative might include fixed displacement pump and a rail pressure control valve that returns a quantity of the fuel back to tank 23 in order to control pressure in liquid fuel common rail 14. Any of these alternative strategies fall within the contemplated scope of the present disclosure.

In the event that engine 5 is utilized in a moving machine, the present disclosure contemplates liquefied natural gas tank 21 having a larger capacity (maybe 65% greater volume) than the distillate diesel fuel tank 23 in order to account for the expected ratios of consumption from both tanks when operating in a standard dual fueling configuration in which maybe over 90% of the fuel delivery to engine 5 is in the form of natural gas and less than 10% in the form of distillate diesel fuel, by mass. This difference in sizing of tanks 21 and 23 also accounts for the densities of the respective liquids as well as the different heating values of the two fuels, as well as accounting for the fact that the natural gas is stored as a liquid but injected as a gas, whereas the distillate diesel fuel is stored and injected as a liquid into engine 5. When operating in a dual fueling mode corresponding to standard operation, electronic controller 15 is configured to maintain the gaseous fuel common rail at a medium low pressure and the liquid fuel common rail 14 at a medium high pressure. If engine 5 is operating in a limp home fueling mode, the electronic controller 15 may be configured to maintain the gaseous fuel common rail 16 at a low pressure and the liquid common rail 14 at a high pressure. For the sake of clarity, the identified high pressure is greater than the medium high pressure, which is greater than the medium low pressure, which is greater than the low pressure.

Figure 2:
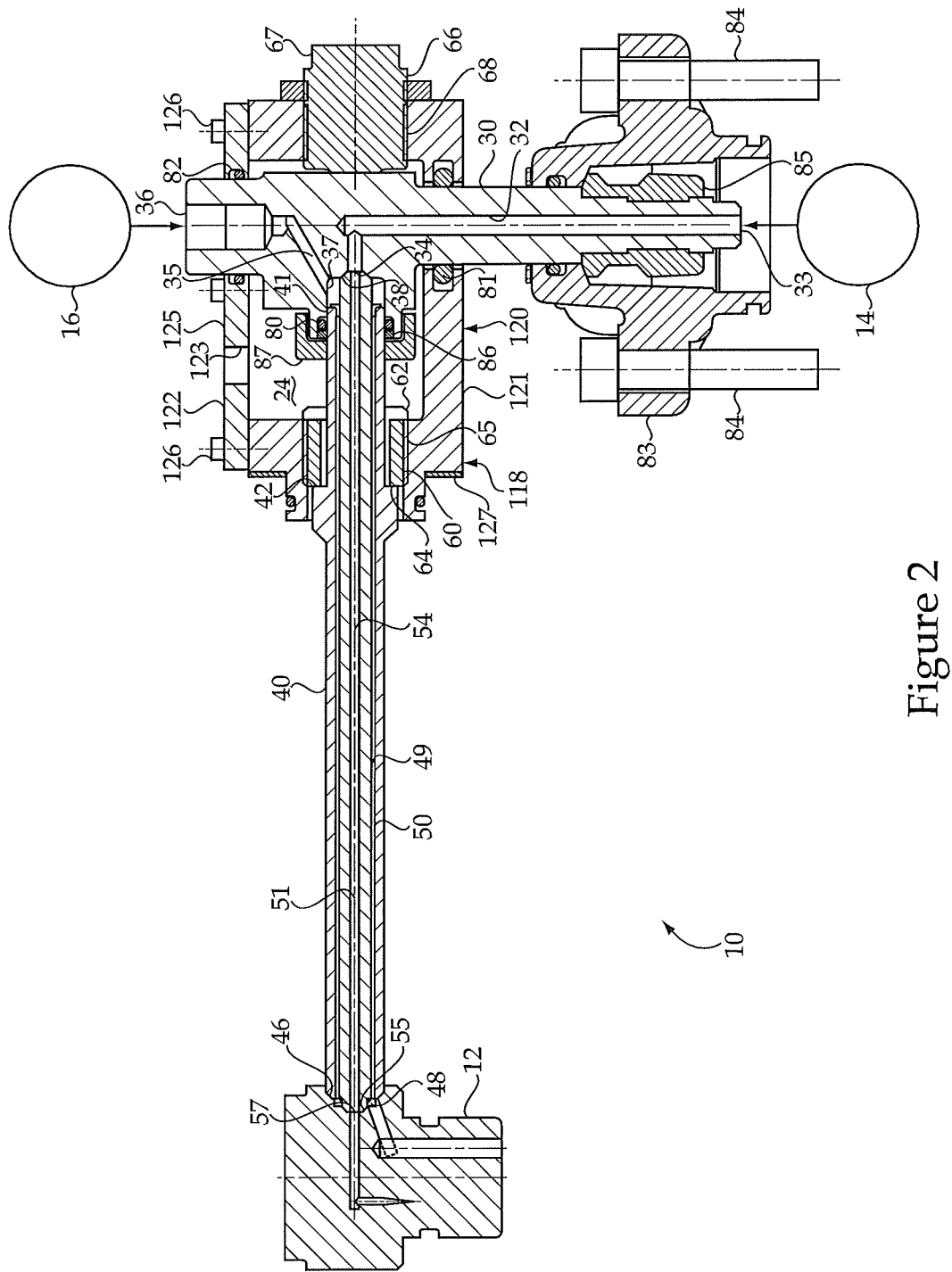
FIG. 2 is a side sectioned view of a portion of the dual fuel system of FIG. 1.

Referring to FIG. 2, the dual fuel common rail system 10 includes a coaxial quill assembly 118 fluidly connecting each fuel injector 12 with liquid and gas common rails 14, 16, respectively. Although the concepts of the present disclosure could apply to a variety of fuels for different types of engines, the illustrated embodiment is particularly suited for a gaseous fuel engine that utilizes distillate diesel fuel for compression ignition. In other words, an engine associated with dual fuel common rail system 10 might primarily burn liquefied natural gas supplied from second common rail 16, and ignite that charge in the engine combustion space by compression igniting a smaller charge of distillate diesel fuel from common rail 14 during a combustion event.

Coaxial quill assembly 118 includes a quill 30 at least partially positioned in a block 120. The quill includes a first fuel passage 32 extending between a first fuel inlet 33, which is fluidly connected to first common rail 14, and a first fuel outlet 34. Quill 30 also defines a second fuel passage 35 extending between a second fuel inlet 36, which is fluidly connected to second common rail 16, and a second fuel outlet 37. Quill 30 is fluidly connected to rails 14 and 16 using known hardware (e.g., fittings) and techniques. Fuel from first common rail 14 is moved through an engine housing 6 (engine head) via an inner passage 51 through inner tube 50, while fuel from second common rail 16 is moved to fuel injector 12 in an outer passage 49 defined between inner tube 50 and an outer tube 40. Inner tube 50 may be of a familiar construction to those skilled in the art, in that it includes rounded or conical ends that are compressed between a conical seat 38 of quill 30 and an inner conical seat 55 of fuel injector 12. Thus, the fluid passage 51 within inner tube 50 extends between first fuel outlet 34 of quill 30 and an inner fuel inlet 57 of fuel injector 12. Outer tube 40, which may have no contact with inner tube 50, has an inner diameter larger than an outer diameter of inner tube 50 in order to define an elongate outer passage 49 that opens on one end to second fuel outlet 37 of quill 30 and at its other end to an outer fuel inlet 48 of fuel injector 12. Outer tube 40 includes a rounded or conical end that is compressed into sealing contact with outer conical seat 46 of fuel injector 12. The outer fuel inlet 48 opens between the inner diameter of tube 40 and the outer surface of inner tube 50. Thus, fuel injector 12 defines an outer conical seat 46 that concentrically surrounds an inner conical seat 55. In addition, the fuel injector 12 includes an inner fuel inlet 57 surrounded by the inner conical seat 55, and an outer fuel inlet 48 positioned between the inner conical seat 57 and the outer conical seat 46.

Outer tube 40 is compressed between quill 30 and the fuel injector 12. In particular, outer tube 40 includes a rounded or conical end in sealing contact with outer conical seat 46 and an opposite end received in a bore defined by quill 30. One end 41 of outer tube 40 is sealed via an O-ring 80 that is positioned in a space 45 between outer tube 40 and quill 30. O-ring 80 is maintained in place against the pressure from second common rail 16 by a back up ring 86 held in place by a cap 87 threaded to quill 30. Outer tube 40 is compressed onto outer seat 46 of fuel injector 12 by an axial force applied to a load shoulder 42 by a compression load adjuster 60 that includes a contact surface 64 in contact with load shoulder 42. Compression load adjuster 60 includes outer threads 65 that mate with a set of inner threads defined by base 121 of block 120, and includes a tool engagement surface 62 located in hollow interior 124 of block 120 to facilitate adjusting a compression load on outer tube 40. Thus, leakage of the second fuel from common rail 16 to atmosphere is inhibited by setting a compression load on the outer tube 40 with compression load adjuster 60 above a predetermined threshold to facilitate a seal at outer conical seat 46, and by sealing the other end with o-ring 80.

Sealing at opposite ends of inner tube 50 is facilitated by a separate load adjuster 66 that includes threads 68 mated to internal threads defined by base 121 of block 120. Load adjuster 66 includes a tool engagement surface 67 located outside of block 20 that facilitates movement of compression load adjuster 66 along a common centerline 54. In other words, compression load adjuster 66 pushes along common centerline 54 against quill 30 to compress inner tube 50 between conical seat 38 of quill 30 and conical seat 55 of fuel injector 12. Because one end 41 of outer tube 40 can slide within quill 30, the respective compression loads on inner tube 50 and outer tube 40 can be adjusted independently to better ensure proper sealing at all of the conical seats 38, 55 and 46. Thus, leakage of the first fuel originating from common rail 14 into the second fuel is inhibited by setting a compression load on the inner tube 50 above a predetermined threshold with compression load adjuster 66. In addition, leakage of the second fuel from common rail 16 into the first fuel from common rail 14 may include setting the pressure in common rail 14 higher than the pressure in common rail 16. Outer tube 40, inner tube 50, compression load adjuster 60, compression load adjuster 66, conical seat 38, inner conical seat 55 and outer conical seat 46 all share a common centerline 54. Other sealing strategies for one or both of inner tube 50 and outer tube 40 apart from that described in relation to the drawings also fall within the contemplated scope of the present disclosure.

As shown, quill 30 may be at least partially positioned within block 120, which includes a base 121 and a cover 122 that may be attached to base 121 by a plurality of fasteners 126. Base 121 may include a flange that facilitates attachment of block 120 to an engine head (housing 6) via bolts (not shown). As shown in the Figures, the first fuel inlet 33 and the second fuel inlet 36 of quill 30 may be located outside of block 120. A shim 127 may be included to adjust the distance between conical seat 38 and conical seat 57 to compensate for geometrical tolerances in the fuel system and engine components. Any of the second fuel that manages to leak past O-ring 80 into hollow interior 124 of block 120, may be vented to atmosphere via vent opening 123. Thus, vent opening 123 might be eliminated in a case where the fuel in common rail 16 is not gaseous at atmospheric pressure. Except for vent opening 123, hollow interior 24 may be substantially closed via an O-ring 81 that is in contact with quill 30 and block 120 and surrounds first fuel passage 32. In addition, a second O-ring 82 may be in contact with quill 30 and block 120 and surround the second fuel passage 35. Thus, vent opening 123 extends between hollow interior 125 and an outer surface 125 of block 120, which is exposed to atmosphere.

Coaxial quill assembly 118 may also include a flange 83, collar 85 and bolts 84 to facilitate a sealed fluid connection between quill 30 and common rail 14. Although co-axial quill assembly 118 is illustrated as including a separate block 120 and quill 30, those skilled in the art will appreciate that the functions and structures of those two components could be merged into a single component without departing from the present disclosure.

Figure 3:
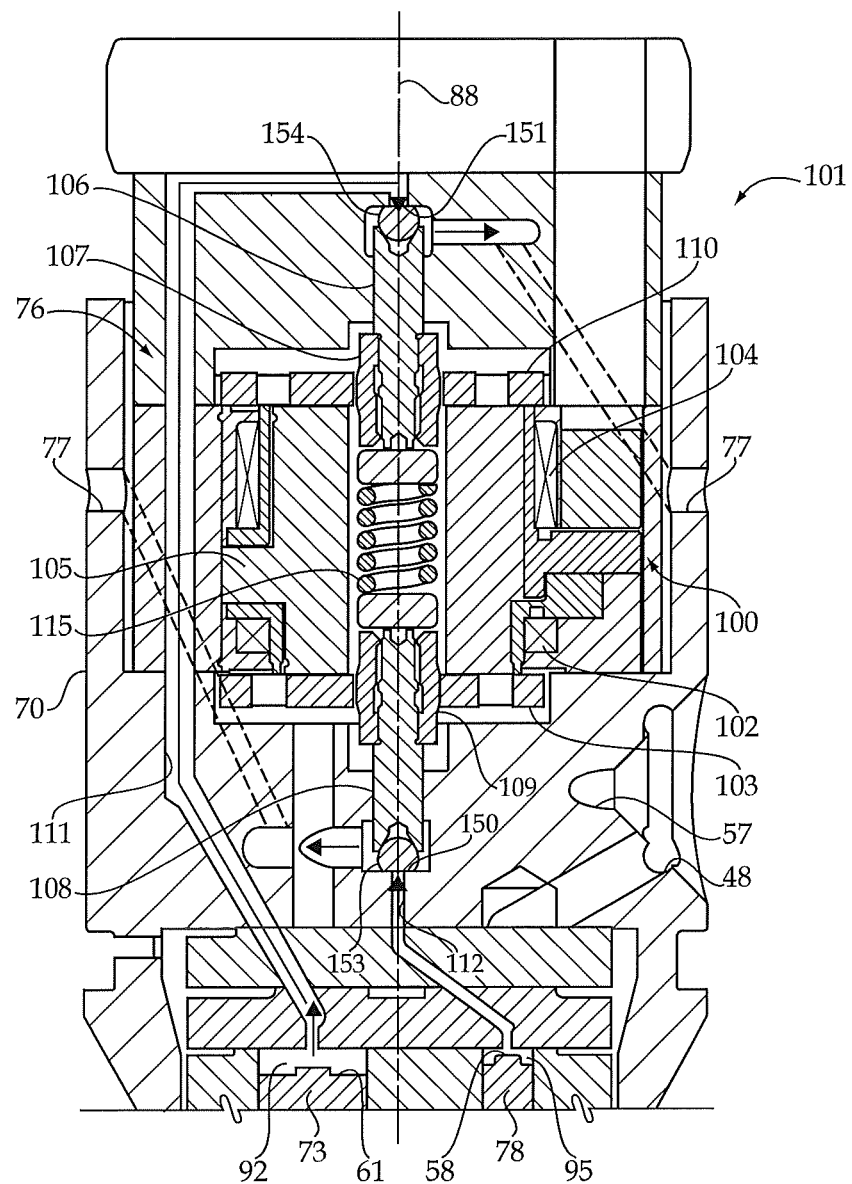
FIG. 3 is a sectioned side view of a top portion of one of the dual fuel injectors from FIG. 1.

Referring now to FIGS. 3-5, each of the fuel injectors 12 includes two control valves 76 that are individually actuated via a dual solenoid actuator 100 in control communication with electronic controller 15. In the illustrated embodiment, the two control valves 76 are each two way valves that open and close respective pressure relief passageways 111 and 112 to a low pressure drain outlet 77. As shown in FIG. 1, drain outlet 77 is fluidly connected to tank 23 via a drain return line 24. Thus, those skilled in the art will recognize that all of the control functions for fuel injector 12 are performed using the liquid fuel as a hydraulic medium in a manner well known in the art. FIGS. 4 and 5 show two different versions of a bottom portion of fuel injector 12. FIG. 4 shows a version in which the fuel injector has concentric sets of gas nozzle outlets 90a and a liquid set of fuel nozzle outlets 96a, whereas FIG. 5 shows a configuration in which the gas nozzle outlets 90b are side by side with the liquid fuel nozzle outlets 96b. In the embodiment of FIG. 5, liquid needle valve member 78b moves along a centerline 79b, and gas needle valve member 73b moves along a centerline 89b that is parallel to, but offset from, centerline 79b. Identical features in the two different fuel injector versions are identified with the same numerals, but the numerals include an "a" in the case of the dual concentric configuration of FIG. 4, and include a designation "b" in the case of the side by side version of FIG. 5. In both versions, the respective gas needle valve member 73 and liquid needle valve member 78 seat at different locations on the same tip component 71 of the injector body 70.

As shown in FIG. 3, a dual solenoid actuator 100 may be utilized for controlling the two control valves 76 in different configurations to provide a noninjection configuration, a liquid or diesel fuel injection configuration, a gaseous fuel injection configuration, and even a combined injection configuration. Dual solenoid 100 is shown in its noninjection configuration with a first armature 110 in an unenergized position and a second armature 103 in an unenergized position. First armature 110 is connected to a pusher 106 by an armature attachment 107 to hold valve member 154 in an upward closed position in contact with flat seat 151 under the action of shared spring 115. When valve member 154 is in its upward closed position, pressure in pressure control chamber 92 (and pressure relief passage 111) is high (rail pressure) and acts upon closing hydraulic surface 61 of gas needle valve member 73 to maintain it in its downward closed position to close gas nozzle outlets 90.

Second armature 103 is connected to a pusher 108 by a second armature attachment 109 to urge valve member 153 into contact with flat valve seat 150 by shared spring 115. When valve member 153 is in its downward closed position, pressure in second pressure control chamber 95 (and pressure relief passage 112) is high (rail pressure) and acts on closing hydraulic surface 58 to help urge diesel needle valve member 78 downward to close liquid nozzle outlets 96. When armatures 110 and 103 are in their unenergized positions, coils 102 and 104 may be in respective unenergized states. It should be noted that dual solenoid actuator 100 utilizes a common or shared stator 105 upon which both coils 102 and 104 are mounted. Thus, magnetic flux necessary to move armature 110 or armature 103, or both is carried by shared stator 105. Valve members 153 and 154 may be made from ceramics and may be un-attached to their respective pushers 108 and 106.

In order to initiate a gas injection event, dual solenoid actuator 100 is changed to a first fuel injection configuration by energizing coil 104 to pull armature 110 downward toward an energized position until the movement of pusher 106 (and armature 110) is arrested by a stop (not shown). When this occurs, valve member 154 moves (is pushed off of seat by high pressure) to an open position out of contact with the flat seat 151 to fluidly connect pressure control chamber 92 and pressure relief passage 111 to low pressure drain 77 via hidden passages shown schematically by dotted lines. When this occurs, the pressure acting on closing hydraulic surface 61 decreases and is overcome by the pressure acting on opening hydraulic surface 69, causing gas needle valve member 89 to move upward to open gas nozzle outlets 90 to the gas fuel inlet 48 (FIG. 2). When it becomes time to end the gaseous fuel injection event, coil 104 is de-energized. This allows shared spring 115 to push valve member 154 back upward into contact with flat seat 151 to block pressure relief passage 111 to increase pressure on closing hydraulic surface 61, causing gas needle valve member 73 to move downward to close the gas set of nozzle outlets 90.

A liquid fuel injection event may be initiated by energizing coil 102 to move armature 103 from its unenergized position to its energized position closer to coil 102. When this occurs, pusher 108 is moved upward to permit valve member 153 to move to an open position out of contact with flat seat 150 due to pressure in relief passage 112. When this occurs, pressure control chamber 95 and pressure relief passage 112 become fluidly connected to low pressure drain 77 (via hidden passages shown schematically by dotted lined) causing the pressure on closing hydraulic surface 58 to drop. When this occurs, the pressure acting on opening hydraulic surface 59 causes diesel needle valve member 78 to move upward to open the liquid set of nozzle outlets 96 to the liquid fuel inlet 57 (FIG. 2). When it comes time to end a liquid fuel injection event, coil 102 may be de-energized. Shared spring 115 then acts on pusher 108 to move armature 103 back upward toward the unenergized position and move valve member 153 back to its closed position in contact with flat valve seat 150 to close the fluid connection between pressure control chamber 95 and low pressure drain 77. When this occurs, pressure on closing hydraulic surface 58 again rises causing diesel needle valve member 78 to move downward to close the liquid set of nozzle outlets 96.

Because dual solenoid actuator 100 can cause valve member 154 and 153 to move to their open positions independently, the dual solenoid actuator 100 also can facilitate a combined injection configuration in which both coils 102 and 104 are energized simultaneously. Armature 110, coil 102, armature 103, coil 104 pusher 106, valve member 154, pusher 108 and valve member 153 may share a common centerline 88. It should be noted that whenever an injection occurs, one of the armatures 110 and 103 moves toward the other of the armature 110 and 103 along common centerline 88.

Figure 6:
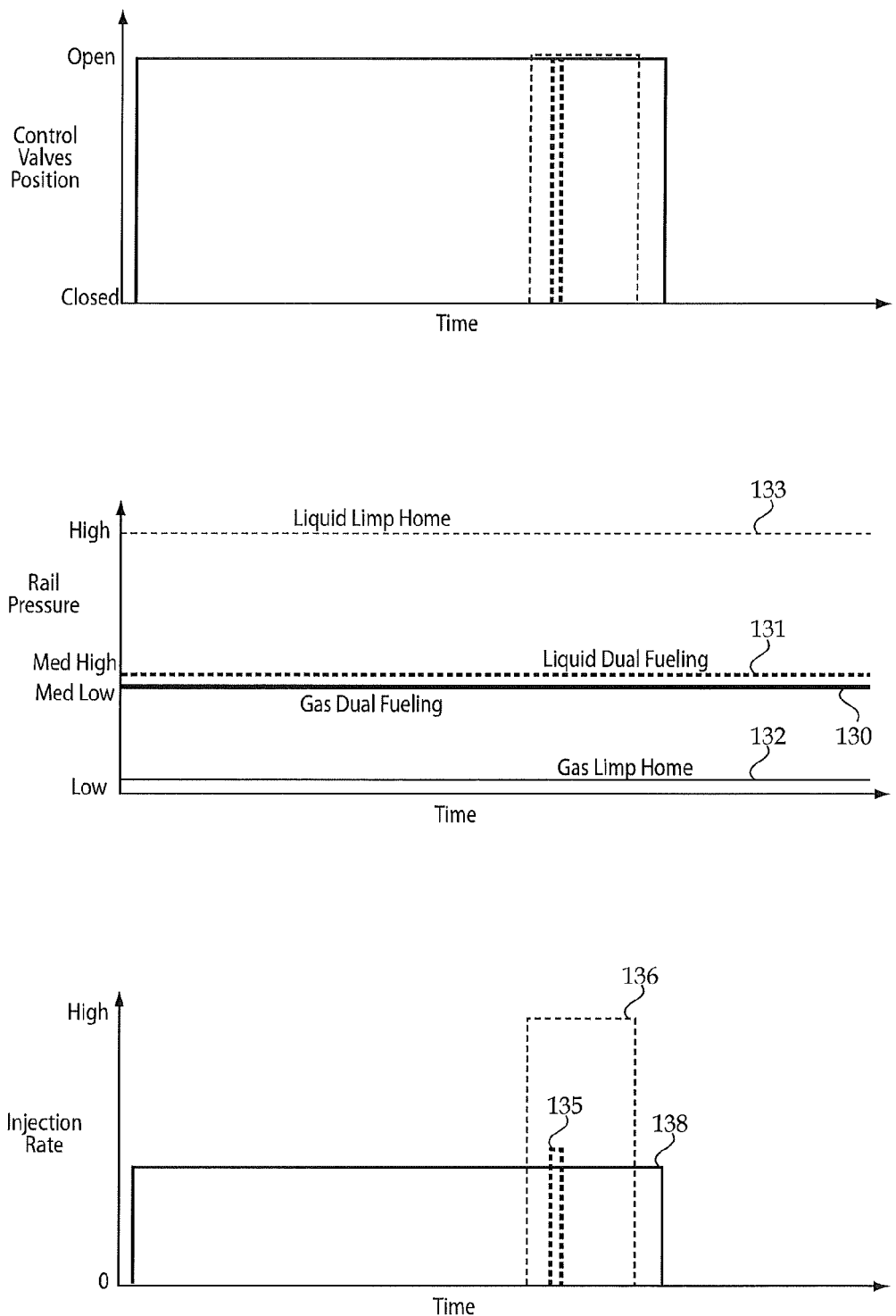
FIG. 6 is a series of graphs showing control valve positions, gaseous and liquid fuel rail pressures and injection rates versus time for the dual fuel system of FIG. 1 when operating in a dual fueling mode and a limp home mode.

Referring now to FIG. 6, during a gas injection event, one of the two control valves 76 is actuated to fluidly connect a pressure control chamber 92 to drain outlet 77. In other words, valve member 154 moves into and out of contact with valve seat 151 responsive to movement of armature 110 between an unenergized position and an energized position, respectively. When this is done, pressure in control chamber 92 drops allowing a gas needle 73 to lift toward an open position against the action of a biasing spring to fluidly connect a gas nozzle chamber 91 to gas nozzle outlets 90. When fuel injector 12 is in a gas injection configuration, the liquid fuel common rail 14 is fluidly connected to drain outlet 77 since pressure control chamber 92 is always fluidly connected to a liquid nozzle supply passage 98 through a small orifice. Liquid nozzle supply passage 98 is always fluidly connected to inner fuel inlet 57 (FIG. 2). When the two control valves 76 are in a liquid injection configuration, the other of the two valves is actuated to fluidly connect the liquid common rail 14 to the drain outlet 77 through a second pressure control chamber 95, which is also always fluidly connected to high pressure in liquid nozzle supply passage 98. In other words, control valve member 153 moves into and out of contact with valve seat 150 responsive to movement of armature 103 between an unenergized position and an energized position, respectively. The two control valves 76 also have a combined injection configuration at which both of the two control valves 76 are moved to an open position so that the liquid fuel common rail 14 is fluidly connected to the drain outlet 77 through the first pressure control chamber 92 and in parallel through the second control pressure chamber 95. Finally, the two control valves 76 have a non-injection configuration at which the liquid fuel common rail 14 is blocked from the drain outlet 77 by having both of the two control valves 76 in a closed position.

In both versions of fuel injector 12 in FIGS. 4 and 5, a gas needle valve member 73 is positioned completely inside of injector body 70 with a guide surface 75 extending in a guide component 72 of injector body 70 between the first pressure control chamber 92 and the gas nozzle chamber 91. The gas nozzle chamber 91 is always fluidly connected to the gaseous fuel common rail 16, and is therefore at about the same pressure as the gaseous fuel common rail 16. A segment 74 of gas needle 73 and the guide component 72 define a portion of an annular volume 94 that is always fluidly connected to liquid common rail 14 via a branch passage that is fluidly connected to liquid nozzle supply passage 98. This structure may help to maintain lubricity and hydraulic locking in the guide clearance 93.

INDUSTRIAL APPLICABILITY

The dual fuel common rail system 10 of the present disclosure finds general applicability to any engine that utilizes two fuels in the combustion space of an associated engine. These two fuels may be the same fuel at two different pressures, or may, as in the illustrated embodiment be different fuels. Although the present disclosure could apply to spark ignited engines utilizing appropriate fuels, the present disclosure finds particular applicability in gaseous fuel engines that utilize a relatively large charge of natural gas that is ignited via compression ignition of a small charge of distillate diesel fuel originating from common rail 14. The coaxial quill assembly 118 of the present disclosure can facilitate movement of both fuels to a fuel injector 12 mounted in the head 6 of an engine 5 via a single bore through the engine head associated with each fuel injector 12 of the engine 5. This strategy conserves valuable space in and around the engine.

By utilizing a block 120 that is bolted to the outer surface of the engine head, separate load adjusters 60 and 66 can be utilized to independently load the inner tube 50 and outer tube 40 onto the conical seats 57 and 46, respectively of fuel injector 12 to inhibit fuel leakage between the fuels and to inhibit fuel leakage to atmosphere outside of fuel injector 12, while accounting for slight dimensional differences associated with each fuel injector fluid connection.

When in operation, the first fuel (distillate diesel) at a first pressure moves from first common rail 14 through the first fuel passage 32, through inner tube 50 and into fuel injector 12. The second fuel (natural gas) at a second pressure is moved from the second common rail 16 through the second fuel passage 35, through the outer passage 49 between outer tube 40 and inner tube 50 and into fuel injector 12. Leakage of the second fuel to the first fuel may be inhibited by setting the pressure in common rail 14 to a medium high pressure (maybe about 40 MPa) that is higher than the pressure in common rail 16, which may be maintained to a medium low pressure (maybe about 35 MPa). Inhibiting leakage of the liquid fuel into the gaseous fuel includes setting a compression load on the inner tube 50 above a first predetermined threshold with the compression load adjuster 66 to create appropriate sealing forces on both ends of tube 50. Leakage of the second fuel to atmosphere may be inhibited by setting a compression load on the outer tube 40 above a second predetermined threshold with the second load adjuster 60 to create a seal between outer tube 40 and fuel injector 12. Leakage of gaseous fuel to atmosphere is inhibited by including at least one o-ring, such as o-ring 80 in contact with outer tube 40. Nevertheless, those skilled in the art will appreciate that other concentric tube supply arrangements could be utilized without departing from the present disclosure. However, in the illustrated embodiment, leakage and variations in geometrical tolerances in the various components of engine 5 and fuel system 10 can be accommodated by utilizing first and second compression load adjusters 60 and 66 to respectively adjust the compression loads in the outer tube 40 and the inner tube 50 individually.

The fuel system 10 according to the present disclosure also includes several subtle functions providing advantages over known dual fuel systems. Among these are independent injection control via separate valves and separate electrical actuators for each of the gas and liquid systems. Thus, the fuel injector 12 can be controlled to inject gaseous fuel only, liquid fuel only, both gaseous and liquid fuel simultaneously, and of course have non-injection mode when no injection occurs. In addition, the dual solenoid actuator 100 conserves space without sacrificing performance capabilities. Although the migration of gaseous fuel into the liquid fuel is generally inhibited by maintaining the liquid fuel common rail 14 at a higher pressure than the gaseous fuel common rail 16, other subtle but important features assist in preventing such leakage. Cross leakage issues are also inhibited by locating the liquid fuel supply in the inner tube 50, and locating the gaseous fuel supply to injectors 12 in the outer passage 49 between inner tube 50 and outer tube 40. By locating these passageways concentrically, each fuel injector 12 can be supplied with both fuels via one passageway through the engine housing 6 (head) rather than two passageways. Lubricity of the moving components within the fuel injector 12 may be maintained by exposure to liquid diesel fuel. For instance, the guide clearance 93 associated with gas needle 73 is maintained with liquid diesel fuel to maintain lubricity, even though one end of the gas needle 73 is always exposed to gaseous fuel in gas nozzle chamber 91.

By utilizing the concentric supply strategy, the fuel system 10 of the present disclosure presents a potential opportunity for retrofitting existing engines with minimized engine cylinder head modifications. The structure of the several versions of fuel injectors 12 also inhibits the leakage of gaseous fuel into the engine cylinder by locating both the gaseous fuel nozzle outlets 90 and the liquid fuel nozzle outlets 96 in a single tip component 71, rather than via some nested needle strategy of a type known in the art. Thus, the fuel injector 12 of the present disclosure avoids stacked tolerances and other uncertainties by making each of the gas and liquid needle structures independent in their movement, seating and biasing features. This strategy may better enable mass production of fuel injectors that perform consistently with the same control signals. Finally the engine 5 of the present disclosure contemplates both a normal dual fueling mode and a limp home mode in which only liquid fuel is injected. For instance, if a malfunction occurs in the gaseous fuel system or if the gaseous fuel supply is exhausted, the electronic controller 15 may cause or allow the engine to switch from a dual fueling mode to the limp home mode.

As best shown in FIG. 6, the dual fueling mode is characterized by a large gas injection quantity 138 and a small quantity injection 135 of liquid fuel. On the otherhand, the limp home mode may be characterized by no gas injection but a large quantity 136 liquid fuel injection. In addition, the normal dual fueling mode is characterized by the gas and liquid common rails 16 and 14 being maintained at medium low and medium high pressures, respectively. On the otherhand, the limp home mode may be characterized by the gaseous fuel common rail being allowed to decay to, or be maintained at, a low pressure, while pressure in the liquid common rail 14 is increased to a high pressure 133 (maybe greater than 100 MPa). When operating in the dual fueling mode, a relatively small injection of liquid distillate diesel fuel is compression ignited to in turn ignite a relatively large charge of gaseous fuel, which may at least partially have been previously injected into the engine cylinder. On the otherhand, during a limp home mode, engine 5 functions as a somewhat conventional diesel engine in which a relatively large quantity of liquid fuel is injected at or around top dead center of the compression stroke to instantaneously ignite upon injection in a known manner.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of operating an engine comprising the steps of:
   injecting a first fuel into an engine cylinder through a first set of nozzle outlets of one of a plurality of fuel injectors;
   injecting a second fuel into the engine cylinder through a second set of nozzle outlets of the one of the plurality of fuel injectors;
   each of the injecting steps includes moving one of a first armature and a second armature toward an other of the first armature and the second armature along a common centerline; and
   igniting the first fuel by compression igniting the second fuel.

2. The method of claim 1, wherein the first fuel is natural gas and the second fuel is diesel fuel.

3. The method of claim 1, wherein the step of injecting the first fuel includes moving a first control valve member along the common centerline; and the step of injecting the second fuel includes moving a second control valve member along the common centerline.

4. The method of claim 1, wherein the injecting steps are performed simultaneously.

5. The method of claim 4 including a step of biasing a first control valve member of each of the plurality of fuel injectors toward a closed position with a shared spring; and biasing a second control valve member of each of the plurality of fuel injectors toward a closed position with the shared spring.

6. The method of claim 5, wherein the step of injecting the first fuel includes moving the first control valve member along the common centerline, and the step of injecting the second fuel includes moving a second control valve member along the common centerline.

7. A method of operating an engine comprising the steps of:

injecting a first fuel into an engine cylinder through a first set of nozzle outlets of one of a plurality of fuel injectors;

injecting a second fuel into the engine cylinder through a second set of nozzle outlets of the one of the plurality of fuel injectors;

each of the injecting steps includes moving one of a first armature and a second armature toward an other of the first armature and the second armature along a common centerline shared with respective first and second pushers in each of the plurality of fuel injectors;

controlling, using the respective first and second pushers, a first and second control valve member corresponding to first and second needle valve members, the first and second needle valve members being further controlled by a shared spring that opens or closes a first pressure relief passage and a second pressure relief passage via the first and second pushers; and igniting the first fuel by compression igniting the second fuel.

8. The method of claim 7, wherein the first fuel is natural gas and the second fuel is diesel fuel.

9. The method of claim 7, wherein said injecting the first fuel includes moving the first control valve member along the common centerline, and said injecting the second fuel includes moving the second control valve member along the common centerline.

10. The method of claim 7, wherein said injecting the first fuel is performed simultaneously with said injecting the second fuel.

11. The method of claim 10 further comprising:

biasing the first control valve member of each of the plurality of fuel injectors toward a closed position with the shared spring; and biasing the second control valve member of each of the plurality of fuel injectors toward a closed position with the shared spring.

12. The method of claim 11, wherein said injecting the first fuel includes moving the first control valve member along the common centerline, and said injecting the second fuel includes moving a second control valve member along the common centerline.

13. A method of operating an engine comprising the steps of:

injecting a first fuel into an engine cylinder through a first set of nozzle outlets of one of a plurality of fuel injectors;

injecting a second fuel into the engine cylinder through a second set of nozzle outlets of the one of the plurality of fuel injectors;

each of the injecting steps includes moving one of a first armature and a second armature of a dual solenoid actuator toward an other of the first armature and the second armature along a common centerline;

coupling a first pusher and a second pusher to the first armature and the second armature, respectively, and operatively to a first control valve member and a second control valve member, respectively, via a first valve seat and a second valve seat, respectively;

moving a first needle valve member and a second needle valve member by moving the first valve seat and the second valve seat, respectively, using a shared spring to open or close a first pressure relief passage and a second pressure relief passage via the first pusher and the second pusher, respectively, wherein the opening and closing of the first pressure relief passage and the second pressure relief passage opens and closes a first hydraulic surface of the first needle valve member and a second hydraulic surface of the second needle valve member; and igniting the first fuel by compression igniting the second fuel.

14. The method of claim 13, wherein the first fuel is natural gas and the second fuel is diesel fuel.

15. The method of claim 13, wherein said injecting the first fuel includes moving the first control valve member along the common centerline, and said injecting the second fuel includes moving the second control valve member along the common centerline.

16. The method of claim 13, wherein said injecting the first fuel is performed simultaneously with said injecting the second fuel.

17. The method of claim 16 further comprising:

biasing the first control valve member of each of the plurality of fuel injectors toward a closed position with the shared spring; and biasing the second control valve member of each of the plurality of fuel injectors toward a closed position with the shared spring.

18. The method of claim 17, wherein said injecting the first fuel includes moving the first control valve member along the common centerline, and said injecting the second fuel includes moving a second control valve member along the common centerline.

19. The method of claim 13, wherein the dual solenoid actuator has a non-injection configuration at which the first armature is at an un-energized position and the second armature is at an un-energized position;

the dual solenoid actuator has a first fuel injection configuration at which a first fuel inlet is fluidly connected to the first set of nozzle outlets, the first armature is at an energized position and the second armature is at the un-energized position; and the dual solenoid actuator has a second fuel injection configuration at which a second fuel inlet is fluidly connected to the second set of nozzle outlets, the first armature is at the un-energized position and the second armature is at an energized position.

20. The method of claim 13 further comprising:
mounting a first coil of the first armature and a second coil of the second armature on a shared stator of the dual solenoid actuator.

* * * * *